United States Patent [19]
Bohn

[11] Patent Number: 5,923,444
[45] Date of Patent: Jul. 13, 1999

[54] FLOATING IMAGE HEAD DESIGN FOR PORTABLE SCANNER

[75] Inventor: David D. Bohn, Ft. Collins, Colo.

[73] Assignee: Hewlett-Packard Company, Palo Alto, Calif.

[21] Appl. No.: 08/834,076

[22] Filed: Apr. 14, 1997

[51] Int. Cl.⁶ .............................. H04N 1/024; G06K 9/22
[52] U.S. Cl. ........................................ 358/473; 382/313
[58] Field of Search .................................. 358/473, 478, 358/474, 472; 382/313, 314; 235/472

[56] References Cited

U.S. PATENT DOCUMENTS

| | | | |
|---|---|---|---|
| 3,918,028 | 11/1975 | Humphrey et al. ..................... | 382/313 |
| 4,376,348 | 3/1983 | Ackeret ..................................... | 40/513 |
| 4,523,235 | 6/1985 | Rajchman ................................ | 358/256 |
| 4,868,676 | 9/1989 | Matsuura et al. ....................... | 358/474 |
| 5,306,908 | 4/1994 | McConica et al. ..................... | 358/473 |
| 5,381,020 | 1/1995 | Kochis et al. .......................... | 358/473 |
| 5,552,597 | 9/1996 | McConica ............................... | 250/234 |
| 5,586,212 | 12/1996 | McConica et al. .................... | 385/146 |
| 5,751,840 | 5/1998 | Raterman et al. ..................... | 382/135 |
| 5,812,172 | 9/1998 | Yamada ................................... | 358/472 |

*Primary Examiner*—Joseph Mancuso
*Assistant Examiner*—Hien Truong

[57] ABSTRACT

A hand-held scanner apparatus may comprise a body having a three axis body coordinate system. An image head is mounted to said body so that the image head may move with respect to at least two axes of the three axis body coordinate system. A bias member connected between the body and the image head biases the image head to a home position and urges the face of the image head against the object during a sweep operation.

19 Claims, 6 Drawing Sheets

FLOATING IMAGE HEAD DESIGN FOR PORTABLE SCANNER

FIELD OF THE INVENTION

This invention relates to imaging devices in general and more specifically to hand-held or portable optical scanners.

BACKGROUND

Imaging devices, such as optical scanners, are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A typical optical scanner includes illumination and optical systems to illuminate the object and to focus a small area of the illuminated object, usually referred to as a "scan line," onto the surface of a photosensitive detector positioned within the scanner. Image data representative of the entire object may then be obtained by sweeping the illuminated scan line across the entire object, either by moving the object with respect to the illumination and optical assemblies or by moving the illumination and optical assemblies relative to the object. The illumination system may include a suitable light source (e.g., a fluorescent or incandescent lamp or an array of light emitting diodes (LEDs)) to illuminate the object, whereas the optical system may include a lens assembly to focus the image of the illuminated scan line onto the surface of the detector.

The photosensitive detector array used to detect the image light focused thereon is typically a charge-coupled device (CCD), although other devices may also be used. A typical CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals, known as sampling intervals, which may be about 5 milliseconds or so for a typical scanner, although other sampling intervals may be used.

The term "image light" as used herein refers to the light that is focused onto the surface of the detector array by the lens assembly. Depending on the type of scanner and the type of document, the image light may be reflected by the document or object being scanned or it may be transmitted through the object or document. The image light is converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals may then be processed and/or stored as desired.

A hand-held or portable optical scanner is an optical scanner which is designed to be moved by hand across a scanned object, e.g., a page of text or a drawing or photograph. Such hand-held or portable optical scanners are well-known in the art and various components thereof are disclosed in U.S. Pat. No. 5,552,597 of McConica, and U.S. Pat. No. 5,586,212 of McConica, et al, which are hereby incorporated by reference for all that they disclose.

One problem associated with many hand-held scanners relates to the ability to maintain the appropriate positional relationship between the illumination and optical systems and the object being scanned. Generally speaking, it is desirable to maintain the optical system at right angles to the surface of the object, although other angles may be used depending on the particular design of the scanner. In any event, if the illumination and, particularly, the optical systems, are not maintained at the proper orientation, the result can be an out of focus image on the detector with a commensurate decrease in scanned image quality. In cases of extreme positional deviation, the resulting image data may be useless. If the hand-held scanner includes a position sensing system such positional deviations may compromise the effectiveness of that system as well.

To illustrate the foregoing problems, a hand-held scanner having a position sensing system may be capable of relatively high scanning speeds (e.g., 18 inches/sec). At such high scanning speeds it is difficult for the user to maintain the proper scanner orientation, particularly when changing scan directions, such as is required at the edge of the document.

The foregoing positional deviation issue does not present a serious problem in desktop and/or flat-bed scanners since the mechanical arrangement of the scanners usually precludes any significant positional deviations between the optical system and the object being scanned. However, the same is not true for many hand-held scanners. That is, since a hand-held scanner is moved by hand across the object being scanned, there is a significant likelihood that the user will induce significant positional deviations by rocking and/or tilting the scanner while sweeping it over the object. While skillful users may be able to sweep the hand scanner over the object without significant positional deviations, the scanning process can be considerably more difficult and frustrating for less-skilled and/or novice hand scanner users.

Therefore, a need exists for a hand scanner that will allow a user to more easily maintain the proper positional relationship between the scanner optics and the object being scanned in order to more consistently produce high-quality scanned image data.

SUMMARY OF THE INVENTION

A hand-held scanner apparatus may comprise a body having a three axis body coordinate system an image head is mounted to said body so that the image head may move with respect to at least two axes of the three axis body coordinate system. A bias member connected between the body and the image head biases the image head to a home position and urges the face of the image head against the object being scanned during a sweep operation.

Also disclosed is a method for scanning an object. The first step in the method is to provide a hand-held scanner apparatus having a body, an image head mounted to the body so that the image head may move with respect to at least two axes of the three axis body coordinate system, and a bias member connected between the body and the image head for urging the image head toward a home position. Next, the hand-held scanner apparatus is positioned on the object so that the face of the image head is in contact with the object. The hand-held scanner is then swept over the object so that the face of the image head remains substantially in contact with the object during the sweeping step.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
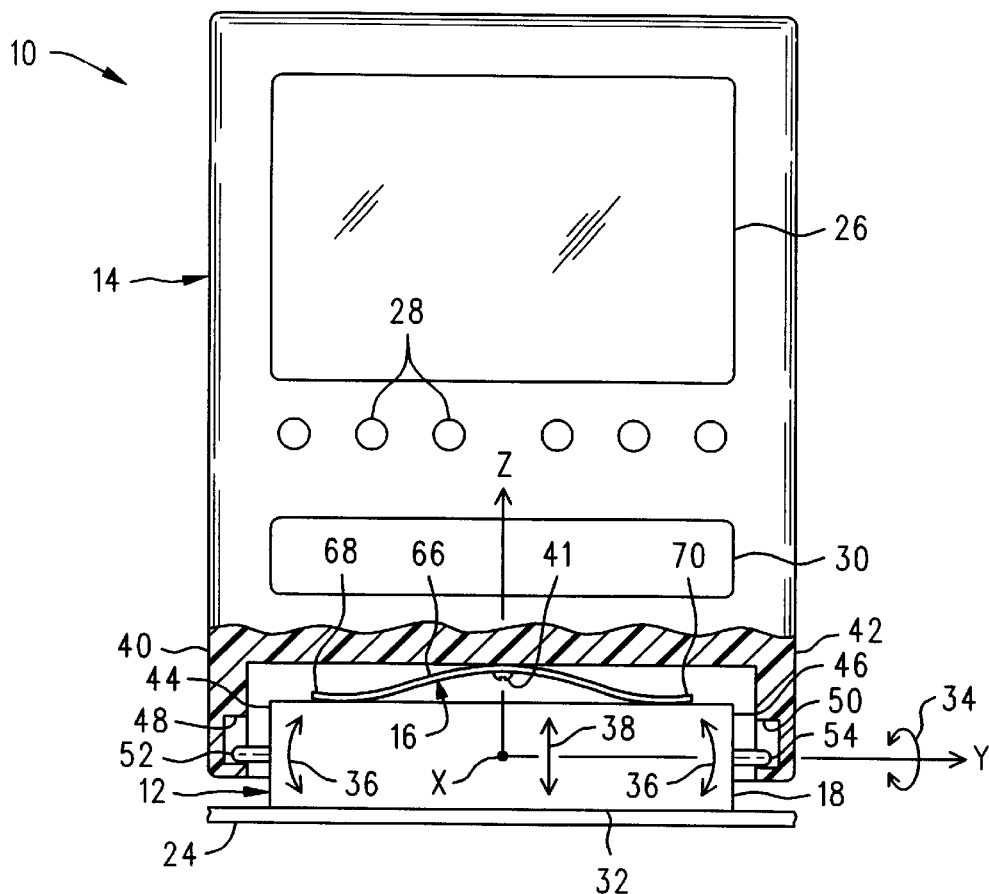
FIG. 1 is a front view in elevation of a first embodiment of a hand scanner according to the present invention with a portion of the scanner body broken away to show the floating image head and leaf spring.

One embodiment of a hand-held scanner apparatus 10 having a floating image head 12 is shown in FIGS. 1–4. Essentially, the hand scanner apparatus 10 includes a body 14 to which is mounted for multi-directional movement an image head 12. A bias member, such as a leaf spring 16, biases the image head 12 in the home position 18, as best seen in FIG. 1. In one preferred embodiment, the image head 12 is moveable with respect to the body 14 along three (3) directions, as indicated by arrows 34, 36, and 38. That is, the mounting system allows for three degrees of freedom of the image head 12 with respect to the body 14. Alternatively, however, the image head 12 could have a greater or lesser number of degrees of freedom, as will be explained in greater detail below.

The body 14 of hand scanner apparatus 10 may include the various electronic components and systems required for the operation of the hand scanner apparatus 10. For example, the body 14 may include a microprocessor and associated random access memory (RAM), read only memory (ROM), and mass data storage device, as well as any other devices and/or circuitry (not shown) that may be necessary or desirable to include in such a hand scanner apparatus 10. The body 14 may also include a display 26, such as a liquid crystal display, for displaying data relating to the function and operation of the scanner 10. A plurality of function buttons 28 and a stop/start bar 30 may also be incorporated into the body 14 to control the various functions of the hand scanner 10 and to initiate and terminate scanning of the document 24. The body portion 14 of scanner 10 may also include an electrical power source, such as a battery (not shown), suitable for supplying the scanner 10 with electrical power.

Figure 2:
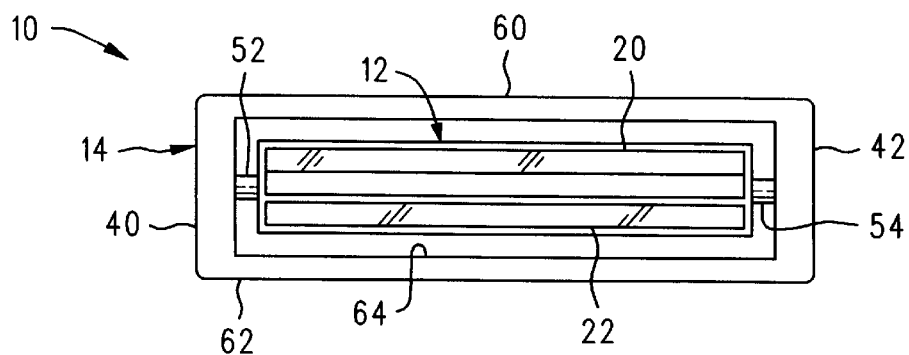
FIG. 2 is a bottom view of the hand scanner showing the face of the image head and the light source and detector windows.
Figure 3:
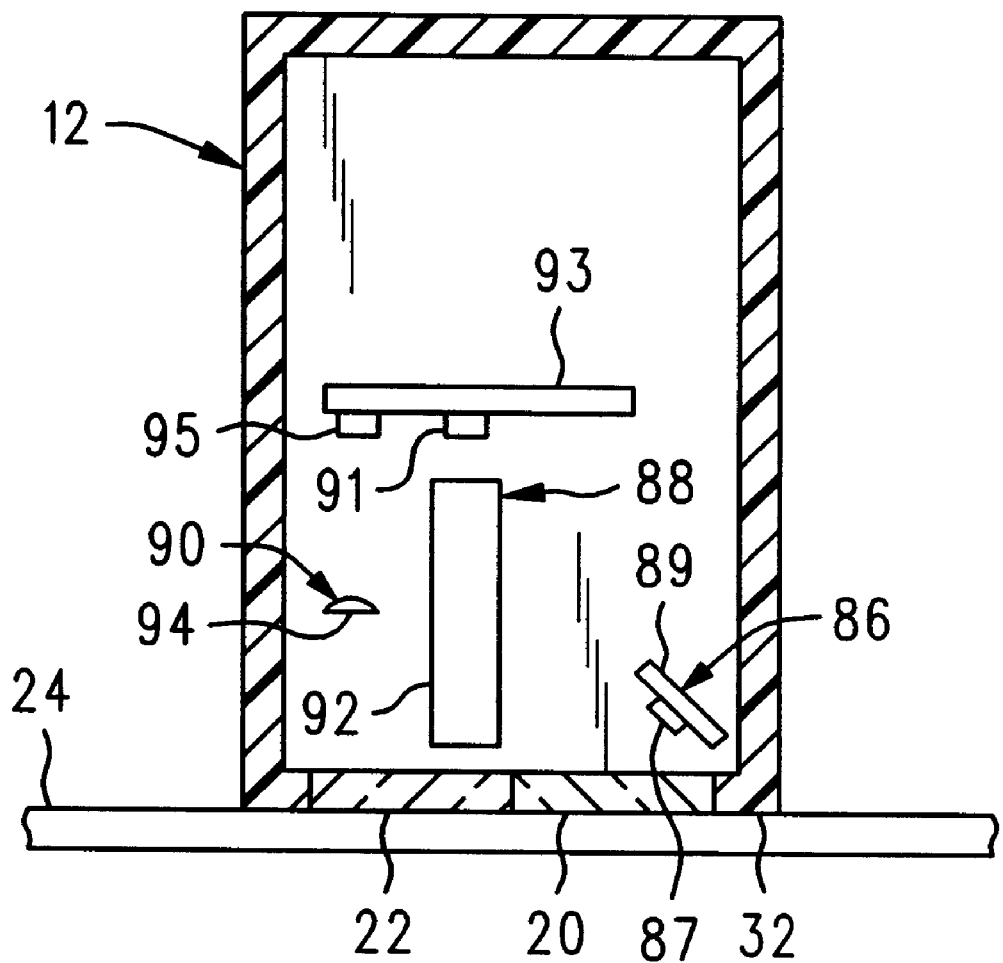
FIG. 3 is a cross-section view in elevation of the image head showing the positional relationship of the light source, detector array, and optics systems.

Referring now to FIG. 3, with occasional reference to FIGS. 1 and 2, the floating image head 12 may be a "contact" type image head wherein the face 32 of image head 12 is designed to remain in contact with the object 24 during the scanning (i.e., sweeping) operation. The face 32 of image head 12 should remain in contact with the object 24 (i.e., not tilted with respect thereto) to ensure peak imaging performance. In one preferred embodiment, the floating image head 12 includes a light source assembly 86 and light source window 20 (FIG. 2) for illuminating a portion of the object 24 being scanned. The image head 12 may also include a detector assembly 88 and detector window 22 for receiving image light reflected by the surface of the object 24 being scanned. The image head 12 may also include an image navigator system 90, which allows the scanner to keep track of its position as it is moved across the object 24, and a paper sensor (not shown) for sensing when the face 32 of the image head 12 is positioned adjacent a piece of paper (e.g., 24). The various components of the image head 12 (e.g., light source assembly 86 and detector assembly 88) may be electrically connected to the scanner circuitry (not shown) contained within the body 14 by any convenient means, such as by a flexible printed wiring board, ribbon cable, etc.

In order to scan the object 24 (e.g., a piece of paper with printed text 25 thereon), the user (not shown) first positions the scanner apparatus 10 so that the face 32 of the image head 12 is positioned flat against the surface of the paper 24. See FIG. 6. Then, after making the appropriate selections with the function buttons 28, the user initiates the scanning process by pressing the start/stop bar 30 and by sweeping the scanner 10 across the page in the scan direction, as indicated by arrow 27. Since the scanner 10 is hand-held, it is likely that the user will be unable to hold the body 14 completely square with respect to the paper 24 during the sweep operation, e.g., the user may rock or tilt the body 14 to some degree during the sweep operation, as indicated by arrows 29 and 31 in FIG. 6. However, since the image head 12 is mounted for multi-directional movement with respect to the body 14, the bias member (e.g., leaf spring 16) helps to maintain contact between the image head 12 and paper 24 so that the face 32 remains firmly seated and flat thereon.

A significant advantage of the present invention is that the floating image head 12 may remain flat against the surface of the object 24 being scanned even though the user may be slightly tilting or rocking the body 14 of the scanner 10 during the sweep operation. Accordingly, it is considerably easier to obtain a high quality scanned image from the hand scanner and with less concentration on the part of the user than would otherwise be possible. The spring force provided by the bias member 16 also provides for improved user "feel" as the scanner 10 is swept across the object 24. Another advantage of the floating image head 12 is that the effective pivot centers of the floating image head 12 are located close to, or even on, the surface of the object 24 which minimizes the tendency for the floating image head 12 to "trip" or "knuckle over" as the user guides the scanner 10 over the object 24.

Having briefly described one embodiment of the hand scanner apparatus 10, as well as some of its more significant features and advantages, the various embodiments of the hand scanner according to the present invention will now be described in detail.

Referring to FIGS. 1–4 simultaneously, the hand scanner apparatus 10 according to the present invention may comprise a body portion 14 to which is mounted for multi-directional movement an image head 12. A bias member, such as a leaf spring 16, mounted between the body 14 and the image head 12 urges the image head 12 toward the home position 18, as best seen in FIG. 1.

The body 14 of hand scanner apparatus 10 may include the various electronic components and systems required for the operation of the hand scanner apparatus 10. By way of example, one embodiment of the body 14 of the hand scanner 10 may include a microprocessor and associated random access memory (RAM), read only memory (ROM), and mass data storage device, as well as any other devices and/or circuitry (not shown) that may be necessary or desirable to include in such a hand scanner apparatus 10. The body 14 may also include a display 26, such as a liquid crystal display, for displaying data relating to the function and operation of the scanner 10. A plurality of function buttons 28 and a stop/start bar 30 may be included to control the various functions of the hand scanner 10 and to initiate and terminate scanning of the document 24. The body portion 14 of scanner 10 may also include an electrical power source, such as a battery (not shown), suitable for supplying the scanner 10 with electrical power.

Since hand scanners are generally well-known in the art and since the details of the various electrical components and systems that may be necessary or desirable in such a hand scanner are not necessary for the understanding of the present invention, the various electronic devices and systems contained within the body 14 will not be described in further detail.

The floating image head 12 may be a "contact" type of image head wherein the face 32 of image head 12 is designed to remain in contact with the object 24 while sweeping the scanner over the object 24. That is, the face 32 of image head 12 should remain in full contact with the object 24 (i.e., not tilted with respect thereto) to ensure optimum focus and peak imaging performance. Referring now to FIG. 3, the floating image head 12 may include a light source assembly 86 for directing light through a window 20 to illuminate the scan line. By way of example, the light source assembly 86 may comprise an array of light emitting diodes (LEDs) 87 mounted to a printed circuit board 89. Alternatively, although other types of light sources, such as incandescent or fluorescent lamps, could also be used. The image head 12 may also include a detector assembly 88 which receives image light through a detector window 22. In one embodiment, the detector assembly 88 may comprise a linear CCD array 91 mounted to a printed circuit board 93 and an optical system 92 for focusing image light from the document onto the CCD array 91. By way of example, the optical system 92 may comprise a SELFOC type of lens array available from Nippon Sheet Glass Co., Ltd. of Shimbashi Sumitomo Bldg., 11-3 Shimbashi 5 Chome, Minato-Ku, Tokyo, Japan, although other types of lenses could also be used. Briefly, a SELFOC lens array comprises a plurality of short, light transmitting rods positioned adjacent one another. The rods are "doped" so that the index of refraction of each rod varies radially across each rod. Therefore, each rod is capable of focusing the image light onto the detector CCD 91 without the need for a separate focusing lens. The image head 12 may also include an image navigator system 90, comprising a lens assembly 94 and a detector 95 to allow the scanner to keep track of its position as it is moved across the object 24. A paper sensor (not shown) may also be included to sense when the face 32 of the image head 12 is positioned adjacent a piece of paper (e.g., 24). The various components of the image head 12 (e.g., light source assembly 20 and detector assembly 22) may be electrically connected to the scanner circuitry (not shown) contained within the body 14 by any convenient means, such as by a flexible printed wiring board, ribbon cable, etc.

Before proceeding with the description of the various embodiments of the hand scanner apparatus, a few terms will be defined. First, it is useful to define a body coordinate system that is fixed with respect to the body 14. Referring now to FIG. 1, such a body coordinate system may comprise an x-axis (shown extending out of the plane of the drawing FIG. 1), a y-axis, and a z-axis. Second, the term "multi-directional movement" as used herein refers to movement along (i.e., translation) or about (i.e., rotation) at least one axis (e.g., the x, y, or z-axis) of the body coordinate system.

In the embodiment shown in FIGS. 1–4, the mounting system provides the image head 12 with three (3) degrees of freedom with respect to the body 14. That is, the image head 12 is free to rotate (within limits) about the x-axis (i.e., in the directions indicated by arrows 36) and about the y-axis (as indicated by arrows 34). The image head 12 is also free to translate along the z-axis, as indicated by arrows 38. Alternatively, the image head 12 may be provided with either a greater or lesser number of degrees of freedom. The limits of motion along and/or about each axis may be selected so as to provide the image head 12 with the desired degree of compliance. For example, in one preferred embodiment, the image head 12 is free to rotate about the y-axis by about 15° in either direction and is free to translate along the z-axis by a distance of about 2 millimeters (mm) (i.e., about 2 mm of vertical travel). Of course, the rotation and translation limits may be greater or lesser than the foregoing limits, depending on the particular design of the scanner 10.

Figure 4:
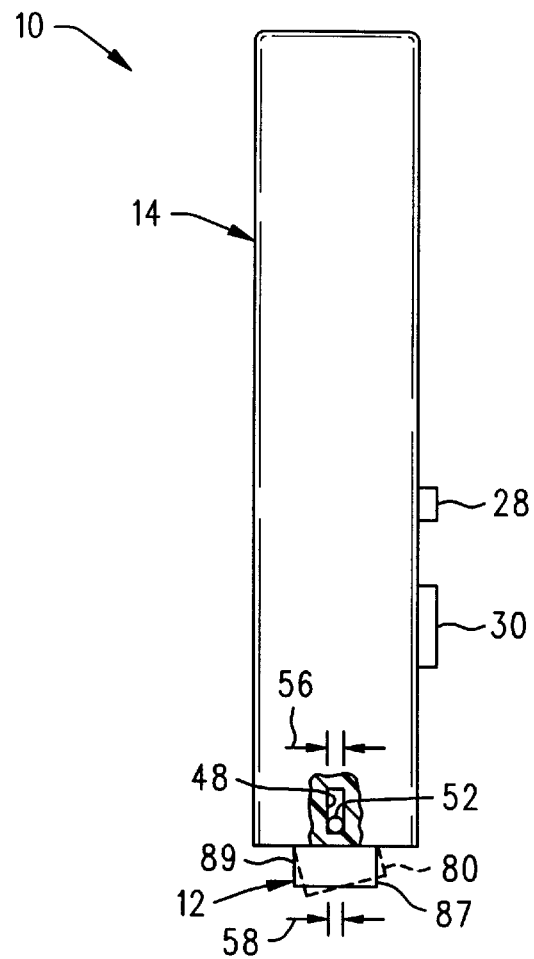
FIG. 4 is a side view in elevation of the hand scanner shown in FIG. 1 showing the image head in the neutral position and showing the image head in a displaced position about the y-axis.

An example of a mounting arrangement that provides for such multi-directional movement of the image head 12 with respect to the body 14 is best seen in FIGS. 1 and 4. Essentially, the body 14 may be provided with a first end support member 40 and a second end support member 42. The end support members 40 and 42 are adapted to receive the respective ends 44, 46 of image head 12. More specifically, each end support member 40, 42, includes a respective slot 48, 50 sized to receive corresponding pins 52, 54 on the ends 44, 46 of the image head 12. See also FIG. 4. The pins 52, 54 do not extend to the full depth of their respective slots 48, 50, which allows the image head 12 to rotate (to a limited degree) about the x-axis, as indicated by arrows 36. The slots 48, 50 are also elongated along the z direction, which allows the image head 12 to translate (again, to a limited degree) along the z-axis, as indicated by arrow 38. The widths of the slots 48, 50 are substantially equal to the diameters of the pins 52, 54, to allow the image head 12 to rotate freely about the y-axis, as indicated by arrows 34, but not to rotate about the z-axis. For example, the width 56 of slot 48 is about equal to the diameter 58 of pin 52, as best seen in FIG. 4. In one preferred embodiment, the body 14 also includes a pair of skirts 60, 62 that connect the end support members 40, 42, thereby defining a well 64 that receives the image head 12.

The body 14 may be made from any of a wide variety of materials, such as metals, plastics, or composite materials, suitable for the intended use. Therefore, the present invention should not be regarded as limited to any particular material comprising the body 14. By way of example, the body 14 in one preferred embodiment comprises injection molded plastic, e.g., polycarbonate material reinforced with about 20% by weight glass fibers. Similarly, the image head 12 may be made from any material suitable for the intended use, such as metals, plastics, or composite materials. In one preferred embodiment, the image head 12 is made from injection molded polycarbonate plastic reinforced with about 20% by weight glass fibers.

The bias member 16 may comprise any of a wide range of devices and materials suitable for urging or biasing the image head 12 toward the home position 18, as shown in FIG. 1. For example, in one preferred embodiment, the bias member may comprise an elongate leaf spring 16 having a center section 66 and a pair of end sections 68, 70. The spring 16 is arched so that the center section 66 is elevated with respect to the end sections 68, 70, as best seen in FIG. 1. The spring 16 is positioned in the well 64 of body 14 so that the center section 66 contacts the body 14 and so that the end sections 68, 70 contact the image head 12. The center section 66 may be attached to the body 14 by any convenient means, such as by a screw or screws 41. Alternatively, the spring 16 may be left unattached to the body 14.

Figure 5:
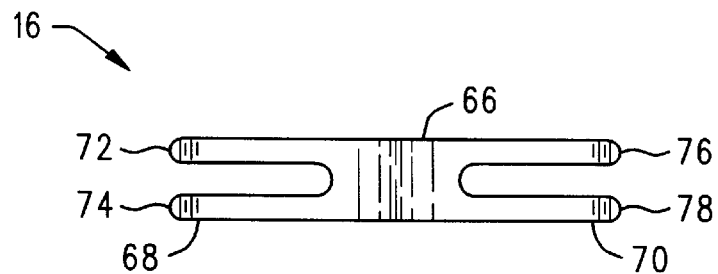
FIG. 5 is a plan view of the leaf spring shown in FIG. 1.

It is preferred that each end section 68, 70 of spring 16 include a pair of fingers 72, 74, 76, and 78 to provide a more independent bias force to each side (i.e., front side 87 and rear side 89, FIG. 3) of the image head 12. That is, the various fingers 72, 74, 76, and 78, provide an improved restoring force to allow the image head 12 to return to the home position 18 from a displaced position 80 about the y-axis. See FIGS. 1 and 4. Referring now to FIG. 5, end section 68 of spring 16 may include a pair of fingers 72 and 74, whereas end section 70 may include fingers 76 and 78. Spring 16 may be made from any of a wide variety of materials, such as metals or plastics, so long as the material allows for a sufficient degree of elastic deformation. The material should also provide the spring constant (i.e., restoring force per unit of displacement) required to ensure contact between the face 32 of image head 12 and the object 24 and the appropriate user "feel." In one preferred embodiment, the spring 16 comprises a beryllium-copper alloy.

Figure 6:
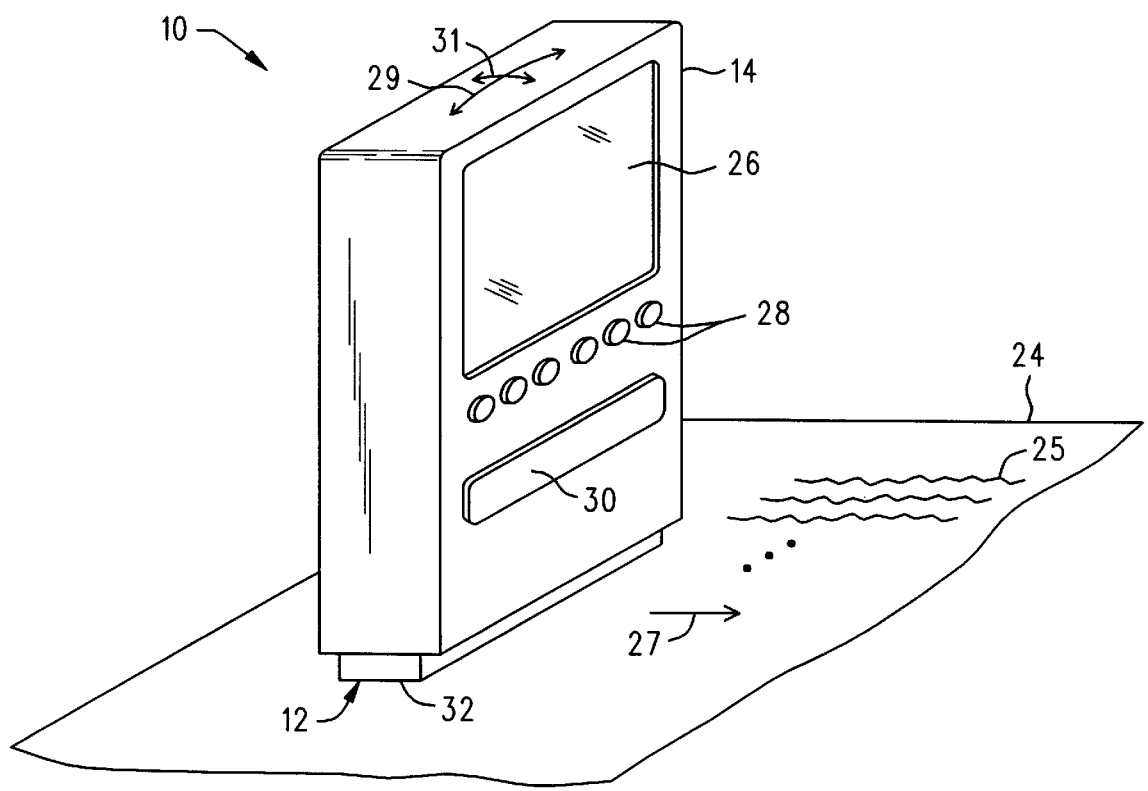
FIG. 6 is a perspective view of the hand scanner apparatus positioned over a document to be scanned.

Referring now to FIG. 6, a user (not shown) may operate the hand scanner apparatus 10 as follows to capture an image of the object 24, e.g., a piece of paper with printed text 25 thereon. As a first step, the user may first position the scanner apparatus 10 so that the face 32 of the image head 12 is positioned flat against the surface of the paper 24. After making the appropriate selections with the function buttons 28, the user may then initiate the scanning process by pressing the start/stop bar 30 and by sweeping the scanner 10 across the page in the scan direction, as indicated by arrow 27. The bias member 16 urges the floating image head 12 against the object 24, thus allowing the face 32 of the image head to remain firmly in contact with the object 24 even though the user may rock or tilt the body 14 to some degree during the sweep operation, as indicated by arrows 29 and 31.

Figure 7:
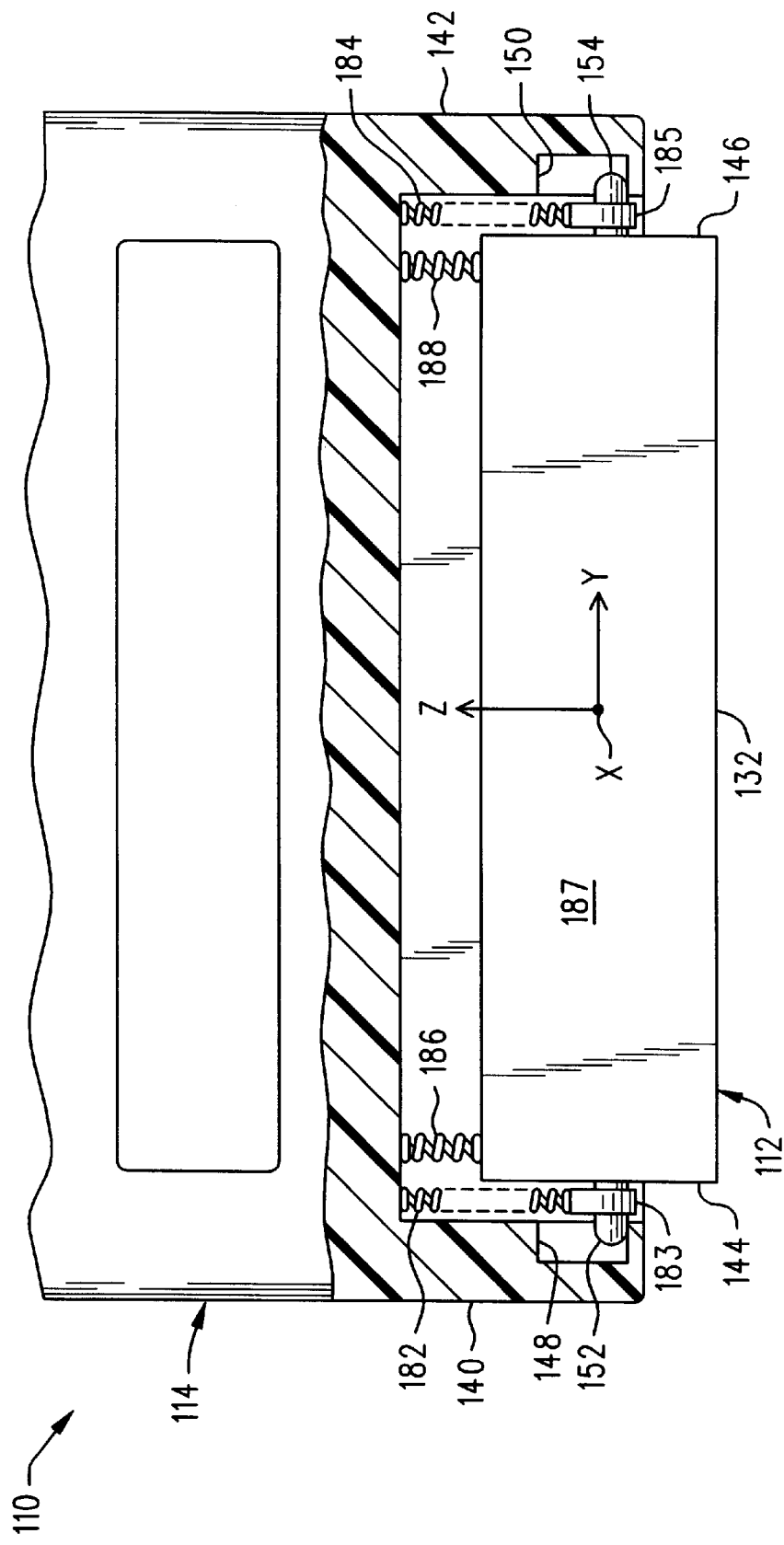
FIG. 7 is an enlarged front view in elevation of a second embodiment of a hand scanner with a portion of the scanner body broken away to show the floating image head and multiple spring support system.
Figure 8:
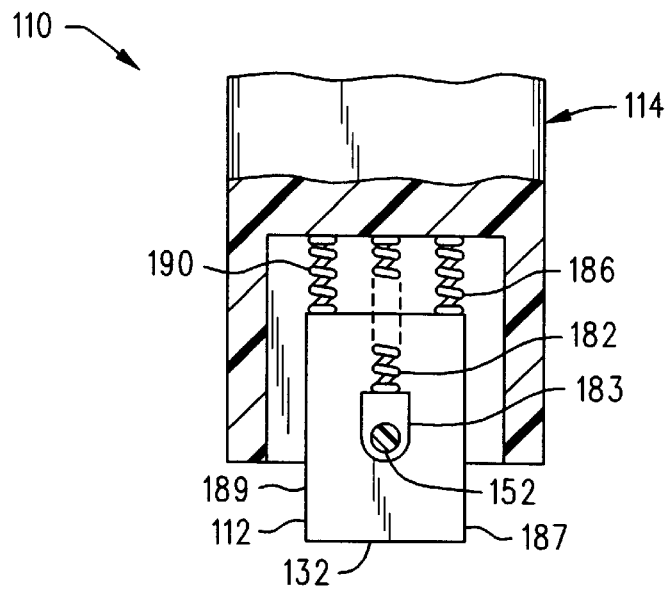
FIG. 8 is a side view in elevation of the multiple spring support system shown in FIG. 7.

As was mentioned above, any of a wide range of bias members may be used to urge the image head 12 toward the home position 18 (FIG. 1). For example, a second embodiment 110 of the hand scanner apparatus may utilize a plurality of compression-type coil springs 182, 184, 186, 188, and 190, as shown in FIGS. 7 and 8. In this second embodiment 110, the mounting of the image head 112 to the body 114 is essentially identical to the mounting of the first embodiment 10. That is, the body 114 includes respective first and second end support members 140, 142 that are adapted to receive the respective first and second ends 144, 146 of image head 112. Each end support member 140, 142 includes a slot 148, 150, respectively, for receiving corresponding pins 152, 154 associated with each end 144, 146 of the image head 112. The slots 148, 150 are elongated along the z-direction to allow the image head 112 to translate along the z-axis. Also, the pins 152, 154 do not extend to the full depth of the respective slots 148, 150, thus allowing the image head to rotate about the x-axis of the body coordinate system. The image head 112 is also free to rotate about the y-axis, as was the case for the first embodiment of the hand scanner apparatus 10.

The bias member used to urge the image head 112 toward the home position 118 (FIG. 7) comprises a plurality of compression-type coil springs 182, 184, 186, 188, and 190. Specifically, a pair of translation springs 182, 184 is connected between the body 114 and each of the pins 152, 154, as is best seen in FIG. 7. Specifically, spring 182 is connected to pin 152 by a sleeve 183 which is free to rotate about pin 152. Spring 184 is similarly connected to pin 154 by a sleeve 185, which is also free to rotate about pin 154. Consequently, the pair of translation springs 182, 184 provides a restoring force in the z-direction only.

The restoring forces about the x- and y-axes are provided by a combination spring assembly. In one embodiment, the combination spring assembly comprises four (4) individual springs (only three of which springs 186, 188, and 190 can be seen in the drawings) mounted between the body 114 and the image head 112. Specifically, the combination spring assembly comprises a first pair of springs 186, 188 located near the front side 187 of image head 112 and a second pair of springs (only one spring 190 of which is shown in FIG. 7) located near the rear side 189 of image head 112, i.e., generally behind springs 186, 188.

The various springs (e.g, 182, 184, 186, 188, and 190) may comprise compression type coil springs of the type that are readily commercially available. The spring constants of the various springs should be selected to provide the desired degree of restoring force and "feel" to the scanner apparatus 110. The selection of the spring constants will also depend on the particular image head/body assembly being used. It should be noted, however, that since the four springs (three of which are shown i.e., 186, 188, 190) comprising the combination spring assembly also provide a restoring force along the z-direction, it will usually be desirable, but not necessarily required, to provide springs 182, 184 with spring constants that are generally less than the spring constants of the four top springs, e.g., 186, 188, 190. In any event, the present invention should not be regarded as limited to any particular kind of spring or spring constant.

Figure 9:
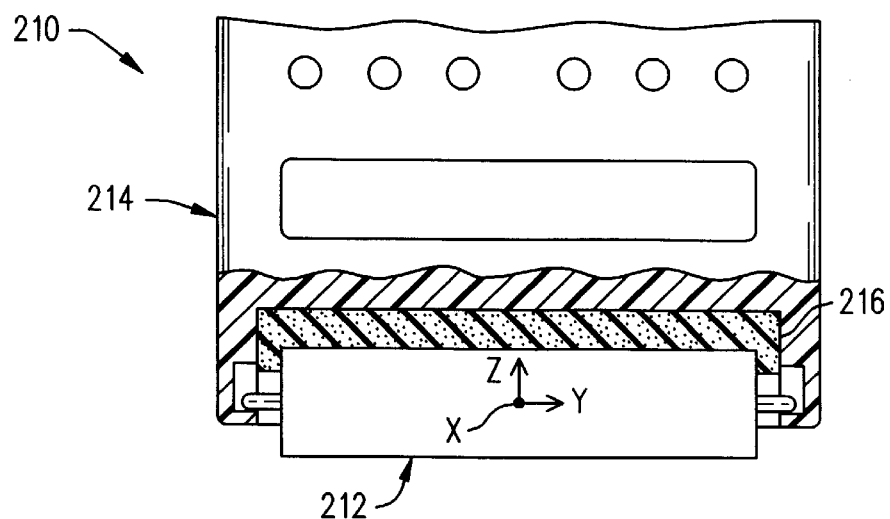
FIG. 9 is a front view in elevation of a third embodiment of a hand scanner with a portion of the scanner body broken away to show the floating image head and resilient foam spring system.

A third embodiment 210 of a hand scanner apparatus according to the present invention is shown in FIG. 9 in which the bias member comprises a resilient foam-like material 216 positioned between the body 214 and image head 212. The resilient material biases the image head 212 toward the home position 218 and provides the restoring force along all axes (i.e., x, y, and z) of the body coordinate system. The shape of the foam-like material 216 and how it is attached to the body 214 and image head 212 may be varied to change the effective spring rate along the various axes, i.e., x, y, and z, thus change the "feel" of the scanner 210 as it is tilted or rocked along the various axes.

Any of a wide range of resilient, foam-like materials may be used, again depending on the desired "feel" and, of course, on the specific design of the body 214 and image head 212. Consequently, the present invention should not be regarded as limited to any particular type of resilient, foam-like material. By way of example, in one preferred embodiment, the resilient, foam-like material comprises "Poron" cellular urethane foam rubber, available from Rogers Corporation, Poron Materials Division, Box 158, East Woodstock, Conn. 06244. Similar foam rubber materials are also available from the 3M Company of Minneapolis, Minn.

It is contemplated that the inventive concepts herein described may be variously otherwise embodied and it is intended that the appended claims be construed to include alternative embodiments of the invention except insofar as limited by the prior art.

What is claimed is:

1. Hand-held scanner apparatus, comprising:
   a body having a three axis body coordinate system;
   an image head including a face for receiving image light from an object being scanned, said image head mounted to said body so that said image head may move with respect to at least two axes of the three axis body coordinate system, wherein said at least two axes define a plane that is substantially parallel to the face of said image head; and
   a bias member connected between said body and said image head for biasing said image head to a home position, said bias member urging the face of said image head against the object during a sweep operation.

2. The hand-held scanner apparatus of claim 1, wherein said image head comprises an elongate member having a first end and a second end and wherein said body includes a first end support member and a second end support member, the first end support member of said body receiving the first end of said image head and the second end support member of said body receiving the second end of said image head so that said image head is retained by said body and is moveable with respect thereto.

3. The hand-held scanner apparatus of claim 2, wherein the first and second ends of said image head include respective first and second pins extending outwardly therefrom and wherein the first and second end support members of said body include respective first and second slots sized to receive the respective first and second pins.

4. The hand-held scanner apparatus of claim 1, wherein said bias member comprises a leaf spring.

5. The hand-held scanner apparatus of claim 4, wherein said leaf spring comprises a generally flat, elongate member having a center portion and two end portions, the elongate member being curved so that the center portion is raised with respect to the two end portions, said leaf spring being positioned between said body and said image head so that the raised center portion contacts said body and so that the two end portions contact said image head.

6. The hand-held scanner apparatus of claim 5, wherein each end portion of said leaf spring comprises two fingers, so that said leaf spring comprises a generally H-shaped member.

7. The hand-held scanner apparatus of claim 1, wherein said bias member comprises a plurality of springs, each of said plurality of springs being connected between said body and said image head.

8. Hand-held scanner apparatus, comprising:
   a body comprising a first support member with a first slot therein and a second support member with a second slot therein;
   an image head mounted for multi-directional movement to said body, said image head comprising an elongate member having a face for receiving image light from an object being scanned, a first end and a second end, the first and second ends of said image head including respective first and second pins extending outwardly therefrom and sized to be received by the respective first and second slots in the first and second support members of said body;
   a first spring connected between said first pin and said body; and
   a second spring connected between said second pin and said body.

9. The hand-held scanner apparatus of claim 8, further comprising a first sleeve slidably retained by the first pin and wherein said first spring is connected between said body and the first sleeve and a second sleeve slidably retained by the second pin and wherein said second spring is connected between said body and the second sleeve.

10. The hand-held scanner apparatus of claim 9, further comprising a third spring positioned between said body and the first end of said image head and a fourth spring positioned between said body and the second end of said image head.

11. The hand-held scanner apparatus of claim 10, further comprising a fifth spring positioned between said body and the first end of said image head adjacent the third spring and a sixth spring positioned between said body and the second end of said image head adjacent the fourth spring.

12. The hand-held scanner apparatus of claim 1, wherein said bias member comprises a resilient material.

13. The hand-held scanner apparatus of claim 12, wherein said resilient material comprises foam rubber.

14. A method for scanning an object, comprising the steps of:
   providing a hand-held scanner apparatus, comprising:
      a body having a three axis body coordinate system;
      an image head including a face for receiving image light from the object, said image head mounted to the body so that said image head may move with respect to at least two axes of the three axis body coordinate system, wherein said at least two axes define a plane that is substantially parallel to the face of said image head; and
      a bias member connected between the body and the image head for biasing the image head to a home position;
   positioning said hand-held scanner apparatus on the object to be scanned so that the face of said image head is in contact with the object; and
   sweeping said hand-held scanner apparatus over the object so that the face of the image head remains substantially in contact with the object during said sweeping step.

15. Hand-held scanner apparatus, comprising:
   a body having a first end support member and a second end support member, said body also having a three axis body coordinate system;
   an image head having a first end and a second end and having a face for contacting an object being scanned, the first and second ends of said image head being received by the respective first and second end support members in said body so that said image head is retained by said body and capable of movement with respect to at least two axes of the three axis body coordinate system;
   a generally flat, elongate spring member having a center portion and two end portions and being curved so that the center portion is elevated with respect to the two end portions, said elongate spring member being positioned between said body and said image head so that the elevated center portion contacts said body and so that the two end portions contact said image head, wherein said elongate spring member biases said image head to a home position, said elongate spring member urging the face of said image head against the object during a sweep operation.

16. Hand-held scanner apparatus, comprising:

a body having a first end support member and a second end support member, and a body coordinate system including an x-axis, a y-axis, and a z-axis;

an image head having a first end, a second end, and a face for receiving image light from an object being scanned, the first and second ends of said image head being received by the respective first and second end support members in said body so that said image head is retained by said body and capable of movement with respect to at least two axes of the body coordinate system wherein said at least two axes define a plane that is substantially parallel to the face of said image head; and a bias member connected between said body and said image head for biasing said image head to a home position.

17. The hand-held scanner apparatus of claim 16, wherein said image head is rotatable about the y-axis.

18. Hand-held scanner apparatus, comprising:

a body having a first end support member and a second end support member and a body coordinate system including an x-axis, a y-axis, and a z-axis;

an image head having a first end and a second end, and a face for receiving image light from an object being scanned, the first and second ends of said image head being received by the respective first and second end support members in said body so that said image head is retained by said body and capable of movement with respect to said body, wherein said image head is rotatable about the x-axis and the y-axis; and a bias member connected between said body and said image head for biasing said image head to a home position.

19. The hand-held scanner apparatus of claim 18, wherein said image head is translatable along the z-axis.

\* \* \* \* \*